Figure 1:
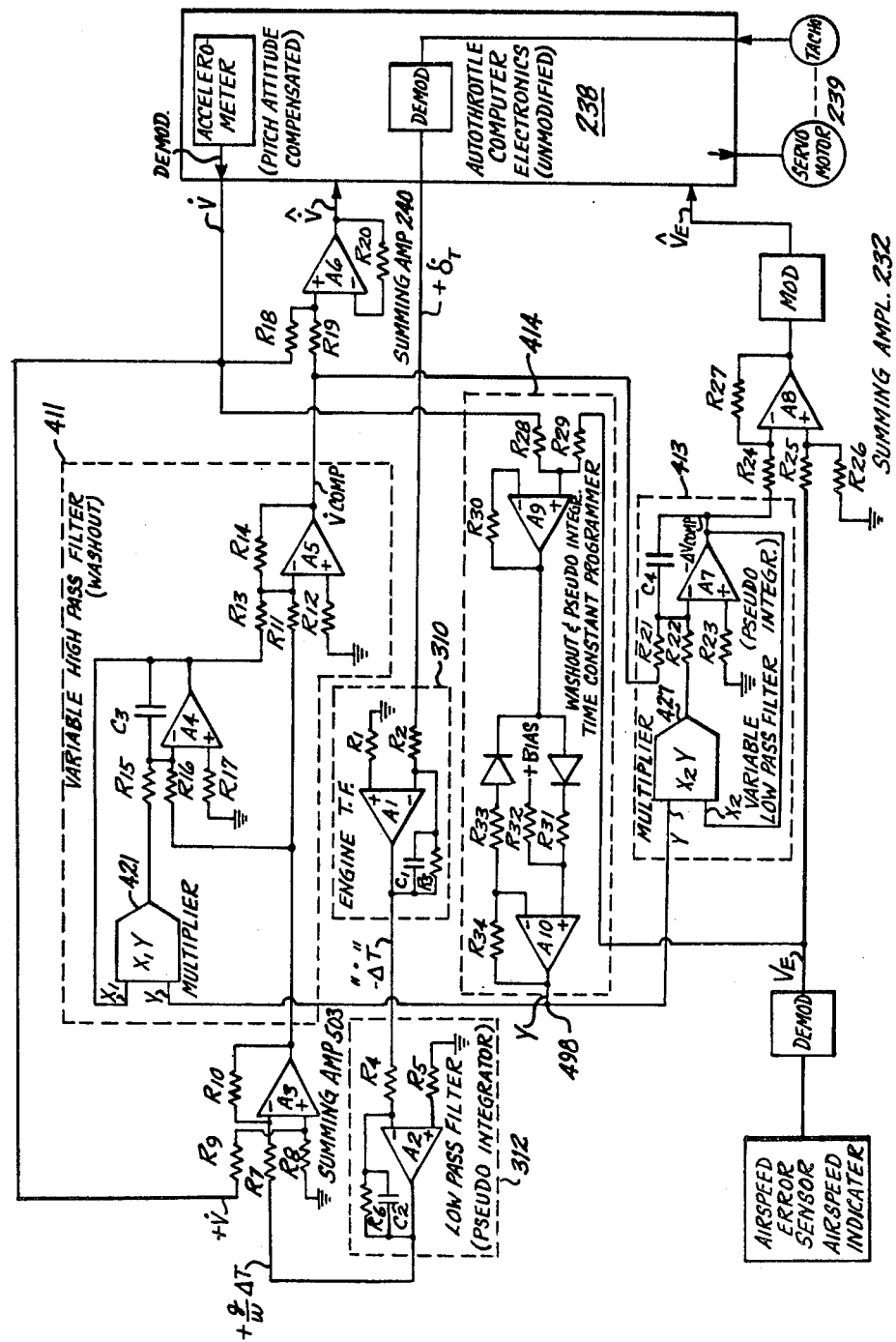

United States Patent [19]

Peter-Contesse

[11] 4,155,525

[45] May 22, 1979

[54] MANEUVER DETECTOR CIRCUIT FOR USE IN AUTOTHROTTLE CONTROL SYSTEMS HAVING THRUST AND FLIGHT PATH CONTROL DECOUPLING

[75] Inventor: Henri Peter-Contesse, Bellevue, Wash.

[73] Assignee: The Boeing Company, Seattle, Wash.

[21] Appl. No.: 844,684

[22] Filed: Oct. 25, 1977

[51] Int. Cl.² .............................................. G05D 1/08
[52] U.S. Cl. ................................ 244/182; 340/27 SS; 364/431; 364/440
[58] Field of Search ............ 73/178 R; 244/181, 182, 244/188; 340/27 R, 27 AT, 27 SS; 364/431, 434, 440

[56] References Cited

U.S. PATENT DOCUMENTS

| | | | |
|---|---|---|---|
| 3,691,356 | 9/1972 | Miller | 244/182 X |
| 3,901,466 | 8/1975 | Lambregts | 244/182 |

Primary Examiner—Stephen G. Kunin
Attorney, Agent, or Firm—Conrad O. Gardner; B. A. Donahue

[57] ABSTRACT

A maneuver detector generates a maneuver-detect signal when signals representative of elevator deflection and flight path deviation are representative of a deliberate maneuver condition and no maneuver-detect signal when the relationship of the two signals is indicative of elevator deflection such as to oppose a flight path deviation, e.g., as caused by turbulence condition or configuration change.

3 Claims, 3 Drawing Figures

MANEUVER DETECTOR CIRCUIT FOR USE IN AUTOTHROTTLE CONTROL SYSTEMS HAVING THRUST AND FLIGHT PATH CONTROL DECOUPLING

This invention relates to aircraft flight control systems having thrust and flight path control decoupling and more particularly to an aircraft maneuver detector circuit which may be utilized in such systems.

A prior art flight control system having thrust and flight path control decoupling is exemplified by U.S. Pat. No. 3,901,466 to Lambregts, assigned to the assignee of this application. The Lambregts system utilizes time-constant programmer circuit means.

It is an object of this invention to provide a flight control system having thrust and flight path control decoupling utilizing maneuver detector and limited integrator circuit means in lieu of the aforementioned time-constant programmer circuit means.

It is yet another object of this invention to provide circuit means responsive to elevator, normal acceleration, and pitch attitude signals for providing a signal having a first predetermined polarity when a purposeful maneuver of the aircraft is effected and a further signal having a polarity opposite to said first predetermined polarity when a non-maneuver is indicated, a purposeful maneuver being defined as one initiated by the pilot as contrasted to non-pilot initiated aircraft maneuvers.

It is still a further object of this invention to provide circuit means including a multiplier circuit connected in series path with a diode for providing maneuver detection signals in response to elevator, pitch attitude, and normal acceleration signals.

Figure 2:
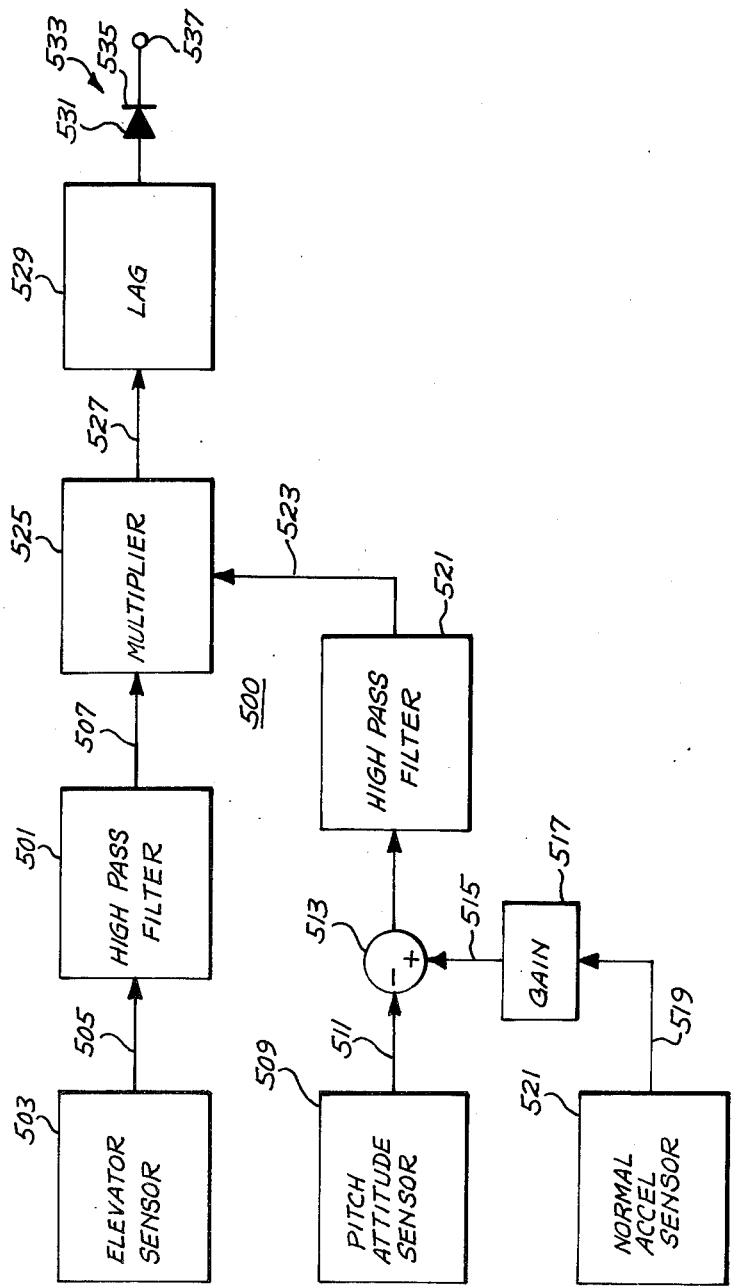
Figure 3:
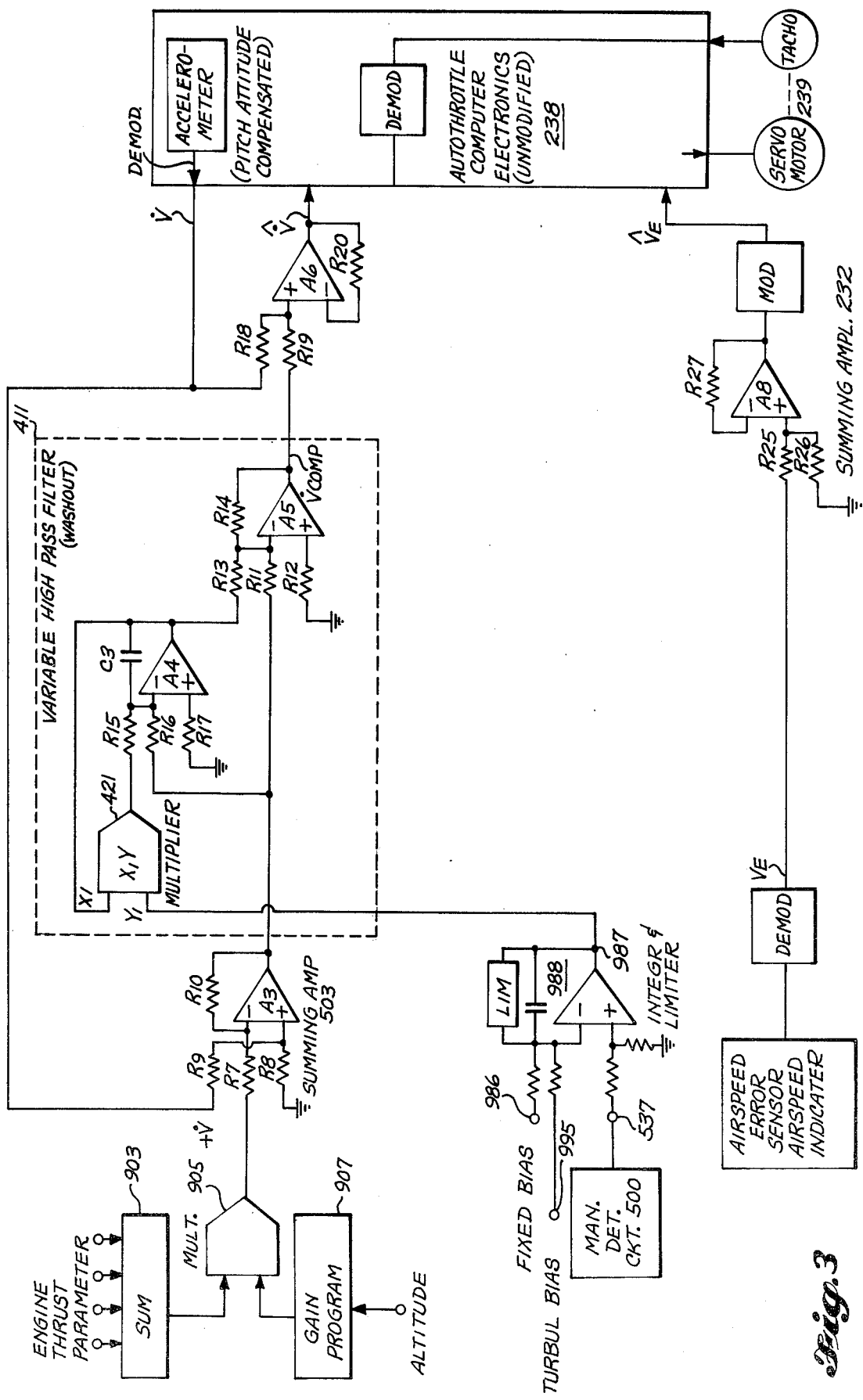

Further objects, features, and advantages of the invention will readily become apparent from the following specification and from the drawings, in which:

FIG. 1 is a schematic diagram of the system shown in FIG. 5 of U.S. Pat. No. 3,901,466, representative of the prior art;

FIG. 2 is a schematic diagram of an embodiment of maneuver detector circuit in accordance with the present invention; and, FIG. 3 is a schematic diagram of autothrottle control system utilizing the maneuver detector in accordance with a flight control system embodiment of the present invention.

Turning now to FIG. 1 (and FIG. 5 of U.S. Pat. No. 3,901,466 corresponding thereto), it will be noted that this complete schematic diagram of prior art autothrottle, including thrust and flight path control decoupling, utilizes time-constant programming as shown in block form in FIG. 4 of the aforementioned U.S. patent for the high pass (411) and low pass (413) filter circuit means which develop the respective compensation signals ($\dot{V}_{comp}$ and $\Delta V_{comp}$). Also, it should be noted that in the system of FIG. 1 the signal representative of $$+g/W\Delta T$$

is shown developed from signals representative of $\delta_T$ generated by throttle servo-tachometer means within the autothrottle computer electronics.

More specifically, in accordance with the system of FIG. 1 a signal ($\delta_T$) representative of the rate of change in throttle position is coupled from autothrottle computer electronics 238 and more specifically from throttle servo-tachometer means 239 to the input of circuit means 310 representative of engine transfer function to develop a signal ($-\Delta \dot{T}$) representative of the rate of change of thrust. Since only short term information is desired, the signal ($-\Delta \dot{T}$) representative of the rate of change of thrust is coupled through low pass filter (pseudo integrator) circuit 312 to provide a signal $$(g/w\Delta T)$$

representative of short term acceleration of the aircraft due to thrust, to a first input of summing amplifier circuit 503. A signal ($+\dot{V}$) representative of longitudinal acceleration is coupled to a further input of summing amplifier circuit 503 to provide an output signal $$-(-\dot{V}+g/w\Delta T)$$

representative of the acceleration of the aircraft due to deviation from the flight path. This output signal taken at the output of summing amplifier circuit 503 is coupled to variable high pass filter (washout) circuit 411 for providing at the output thereof a compensation signal ($\dot{V}_{comp}$) which is summed in summing amplifier 240 with a signal ($+\dot{V}$) representative of longitudinal acceleration to provide a signal ($\dot{V}$) representative of compensated longitudinal acceleration for coupling to autothrottle means 238 for use as a new thrust control damping signal replacing $\dot{V}$. A multiplier circuit 421 is connected to provide feedback gain multiplication of a amplifier A4 in response to the amplitude of control signal Y provided by time constant programmer circuit means 414. Input signal $X_1$ of multiplier 421 being the output of amplifier A4 is multiplied in magnitude by a factor proportional to the magnitude of the second input signal Y to multiplier 421, whereby Y is the output of the washout and pseudo integrator time constant programmer circuit 414. The time constant $\pi_1$ of high pass filter circuit 411 is thereby controlled by and is inversely proportional to the amplitude of control signal Y. The compensation signal ($\dot{V}_{comp}$) developed at the output of variable high pass filter circuit means 411 is utilized to provide a further compensation signal ($\Delta V_{comp}$) at the output of low pass filter circuit means 413 which is representative of air speed error due to deviation from the flight path of the aircraft. This further compensation signal ($\Delta V_{comp}$) is summed in summing amplifier 232 with a signal $V_E$ representative of air speed error to provide a signal $\dot{V}_E$ representative of compensated air speed error for coupling to autothrottle means 238 for use as a new thrust control reference signal. The time constant of variable low pass filter circuit means 413 is responsive to the amplitude of control signal Y, being the second input of multiplier circuit 427 which is coupled in the feedback loop of amplifier A7 for multiplying the feedback $X_2$ of amplifier A7, which is the first input to multiplier circuit 427, by a factor proportional to Y. The time constant $\pi_2$ of low pass filter (pseudo integrator) circuit means 413 is therefore inversely proportional to the amplitude of control signal Y. A first signal representative of longitudinal acceleration ($\dot{V}$) are amplified and combined in time constant programmer circuit means 414 and a bias signal (+bias) is added to provide a time constant programming control signal Y at the output of time constant programmer circuit means 414 which establishes predetermined minimum loop gains in variable high pass filter circuit means 411 and variable low pass filter circuit means 413 respectively when signals representative of $V_E$ and $\dot{V}$ are both equal to zero. The amplifier circuit A9 and further amplifier circuit A10 coupled in series circuit between the input signal representative of $\dot{V}$ and $V_E$ and the output terminal 498, provides amplification $K_{V_E}$ and $K_{\dot{V}}$ for respectively increasing the loop gain of washout circuit 411 and pseudointegrator circuit 413 so that the compensation signals ($\dot{V}_{comp}$ and $\Delta V_{comp}$) are amplitude limited so as to compensate only for air speed errors smaller than about 5 knots which are induced by flight path deviations.

Deviation of the engine as represented by the circuit 310 from actual engine performance under a preselected set of conditions affects the performance of the energy compensation system of FIG. 1. The main deviation occurs with thrust change per degree of throttle position change from preselected conditions, and within the range of variation of this parameter normally encountered by the energy compensation system of FIG. 1 will operate satisfactorily although not optimally everywhere. An alternate approach to utilizing transfer function circuit 310 for deriving a signal representative of $\Delta \dot{T}$ for the present energy compensation system is to use another parameter that more closely represents thrust throughout the operating range, such as Engine Pressure Ratio (EPR) or fan speed ($N_1$) in the manner shown in FIG. 6 of aforementioned U.S. Pat. No. 3,901,466 to Lambregts. Although the energy compensation system embodiment of FIG. 6 of the Lambregts patent requires one additional sensor input, the signal source representative of EPR or $N_1$ does not require throttle rate pseudo integration or the engine transfer function signal processing circuits as shown in the system of FIG. 1. Since the total thrust may vary due to the failure of one engine, the system may take this into consideration by providing a summing of all four engine EPR's, each with ¼ of the thrust gain constant.

It should be noted from FIG. 1 that the compensation signal $\Delta V_{comp}$ provided at the output of low pass filter circuit means 413 is summed with the signal ($V_E$) representative of air speed error in summing amplifier circuit 232 to provide the compensated air speed error signal ($V_E$) which is coupled to the autothrottle computer circuit means 238 for utilization as the improved thrust control reference signal, replacing the signal $V_E$ utilized by prior art autothrottle computer circuit means. For more details of the signal processing of the system of FIG. 1 and further understanding thereof, reference to U.S. Pat. No. 3,901,466 may be made and is incorporated herein by reference thereto herein made.

Turning now to FIGS. 2 and 3, it will be observed that the autothrottle control system of FIG. 3 utilizes maneuver detector circuit 500 of FIG. 2 and integrator limiter 988 instead of the time-constant programmer 414 utilized in autothrottle control system of FIG. 1.

Maneuver detector circuit 500 as shown in FIG. 2 includes washout circuit means comprising high pass filter circuit 501 responsive to signal 505 representative of elevator deflection from elevator sensing means 503 for providing signal 507. Pitch attitude sensing means 509 provides a signal 511 representative of pitch attitude, which is combined in combining circuit means 513 with a further signal 515 coupled from the output of amplifier circuit means 517, which amplifier circuit means provides amplification of signal 519 representative of normal acceleration provided by normal acceleration sensing means 521. A washout circuit comprising high pass filter circuit means 521 is coupled from the output of combining circuit means 513 to provide signal 523 representative of flight path deviation at a first input terminal of multiplier circuit means 525, while aforementioned signal 507 from the output of high pass filter circuit 501 is coupled to a second input terminal of multiplier circuit means 525. Output signal 527 from multiplier circuit means 525 is coupled through lag circuit 529 to the anode 531 of diode 533, the cathode 535 of diode 533 being connected to output terminal 537 of maneuver-detector circuit 500.

MANEUVER

A positive elevator deflection (trailing edge down) will cause a positive polarity signal 507 and a "nose down" attitude change; as the pitch attitude signal 511 becomes more negative, signal 523 will become positive, causing the polarity of the product of signals 507 and 523 to become positive and the maneuver-detector circuit 500 output signal at output terminal 537 to be positive in polarity. A negative elevator deflection in accordance with the preceding will cause the polarity of both signals 507 and 523 to be negative and their product positive, thereby providing a maneuver detect signal.

NON-MANEUVER

In turbulence or during configuration changes, the elevator, under autopilot control in a flight path mode, will oppose flight path deviations, signals 507 and 523 will be of opposite polarity, thereby resulting in their product being of negative polarity and no signal (non-maneuver) will appear at output terminal 537 side of block diode 533.

Turning now to FIG. 3 and making a comparison with the schematic diagram of the prior art system of FIG. 1, it will first be noted that the present system of FIG. 3 does not include low pass filter 312, variable low pass filter 413, circuit 310 representative of engine transfer function, or time constant programming means 414, but that the present maneuver-detector circuit 500 together with integrator limiter circuit 988 coupled downstream therefrom is utilized instead of time constant programming means 414. Also, the signal (g/wΔT) is generated in the system of FIG. 3 as follows: Engine thrust parameter inputs, e.g., $N_1$ or EPR (four inputs being shown for averaging in the case of four engines), are provided to summing circuit 903 and a signal which is a function of altitude is provided, e.g., $\delta$, to gain programming circuit 907 with the outputs of summing circuit 903 and gain programming circuit 907 multiplied in multiplier circuit 905, the output of multiplier circuit 905 then being coupled to resistor $R_7$ of summing amplifier circuit 503. This reflects the fact that thrust change (ΔT) is proportional to the sum of engine EPR's, the proportionality factor changing with altitude, and enables the signal (g/wΔT) to be more truly representative of thrust-related acceleration, since (1) it reflects the number of operating engines, (2) it takes into account the effect of altitude on thrust, and (3) it tends to minimize the impact of engine and control cable discontinuities on speed control performance.

It should be noted that terminal 498 of FIG. 1 corresponds to output terminal 987 of integrator and limiter circuit 988, while to the input terminals 986, 985 and 537 of circuit 988 are coupled, respectively, fixed bias, turbulence bias and maneuver detector 500 output signals. Utilization of a fixed bias at input terminal 986, and a turbulence bias signal at input terminal 985 with the maneuver detector circuit signals at input terminal 537 as the inputs to integrating and limiting circuit 988 results in smooth system engagement and in smooth transitions from short to long time constants, as well as long to short time constants.

I claim:

1. In combination in an autothrottle control system for an aircraft having an input terminal for receiving a signal representative of compensated longitudinal acceleration:

means for providing a first signal representative of
$-V + g/w\, \Delta T)$
where
$V$ = aircraft longitudinal acceleration, inertial
$g$ = gravity constant,
$w$ = aircraft weight, and
$\Delta T$ = incremental change in thrust;
variable time constant filter means responsive to said first signal for providing a first compensation signal;
means for providing a signal representative of longitudinal acceleration information of said aircraft;
means having an output terminal for combining said first compensation signal and said signal representative of longitudinal acceleration information of said aircraft for providing said signal representative of compensated longitudinal acceleration at said output terminal, said output terminal coupled to said input terminal;
a maneuver detector circuit for generating a maneuver detect signal when signals representative of elevator deflection and flight path deviation are representative of a deliberate maneuver condition and a non-maneuver detect signal when said signals representative of elevator deflection and flight path deviation are indicative of elevator deflection such as to oppose a flight path deviation of the aircraft due to turbulence or configuration change of the aircraft; and,
integrating and limiting circuit means coupled between said maneuver detector circuit and said variable time constant filter means.

2. In combination in an autothrottle control system for an aircraft having an input terminal for receiving a signal representative of compensated longitudinal acceleration:

means for providing a first signal representative of
$(-V + g/W\, \Delta T)$
where
$V$ = aircraft longitudinal acceleration, inertial
$g$ = gravity constant,
$W$ = aircraft weight, and,
$T$ = incremental change in thrust;
variable time constant filter means responsive to said first signal for providing a first compensation signal;
means for providing a signal representative of longitudinal acceleration information of said aircraft;
means having an output terminal for combining said first compensation signal and said signal representative of longitudinal acceleration information of said aircraft for providing said signal representative of compensated longitudinal acceleration at said output terminal, said output terminal coupled to said input terminal;
a maneuver detector circuit;
integrating and limiting circuit means coupled between said maneuver detector circuit and said variable time constant filter means; and
wherein said means for providing a first signal representative of $(-V + g/W\Delta T)$ comprises:
summing circuit means responsive to a plurality of signals representative of a thrust paratmeter of a corresponding plurality of engines for said aircraft for providing a summary circuit output signal;
gain programming circuit means responsive to a signal representative of altitude of the aircraft for providing a gain programming circuit output signal;
multiplier circuit means responsive to said summing circuit output signal and said gain programming circuit output signal for providing a signal representative of $+(g/W)\Delta T$; and
summing amplifier circuit means responsive to said signal representative of $+(g/W)\Delta T$ and said signal representative of longitudinal acceleration information of said aircraft for providing said first signal representative of $(-V + g/W\Delta T)$.

3. An aircraaft maneuver detector circuit having an output terminal for providing a positive polarity signal upon the occurrence of a pilot-initiated maneuver, said circuit comprising:

means for providing a signal representative of elevator deflection;
means for providing a signal representative of flight path deviation;
multiplier circuit means responsive to said signal representative of elevator deflection and said signal representative of flight path deviation for providing said positive polarity signal upon the occurrence of said pilot-initiated maneuver and a negative polarity signal upon the occurrence of other maneuvers; and,
a diode coupled between said multiplier circuit means and said output terminal for providing said positive polarity signals at said output terminal upon the occurrence of said pilot-initiated maneuver.

* * * * *